April 2, 1957     W. COULSON     2,787,376
AUTOMATIC CHECK VALVE FOR DRAIN PIPE
Filed Sept. 13, 1954
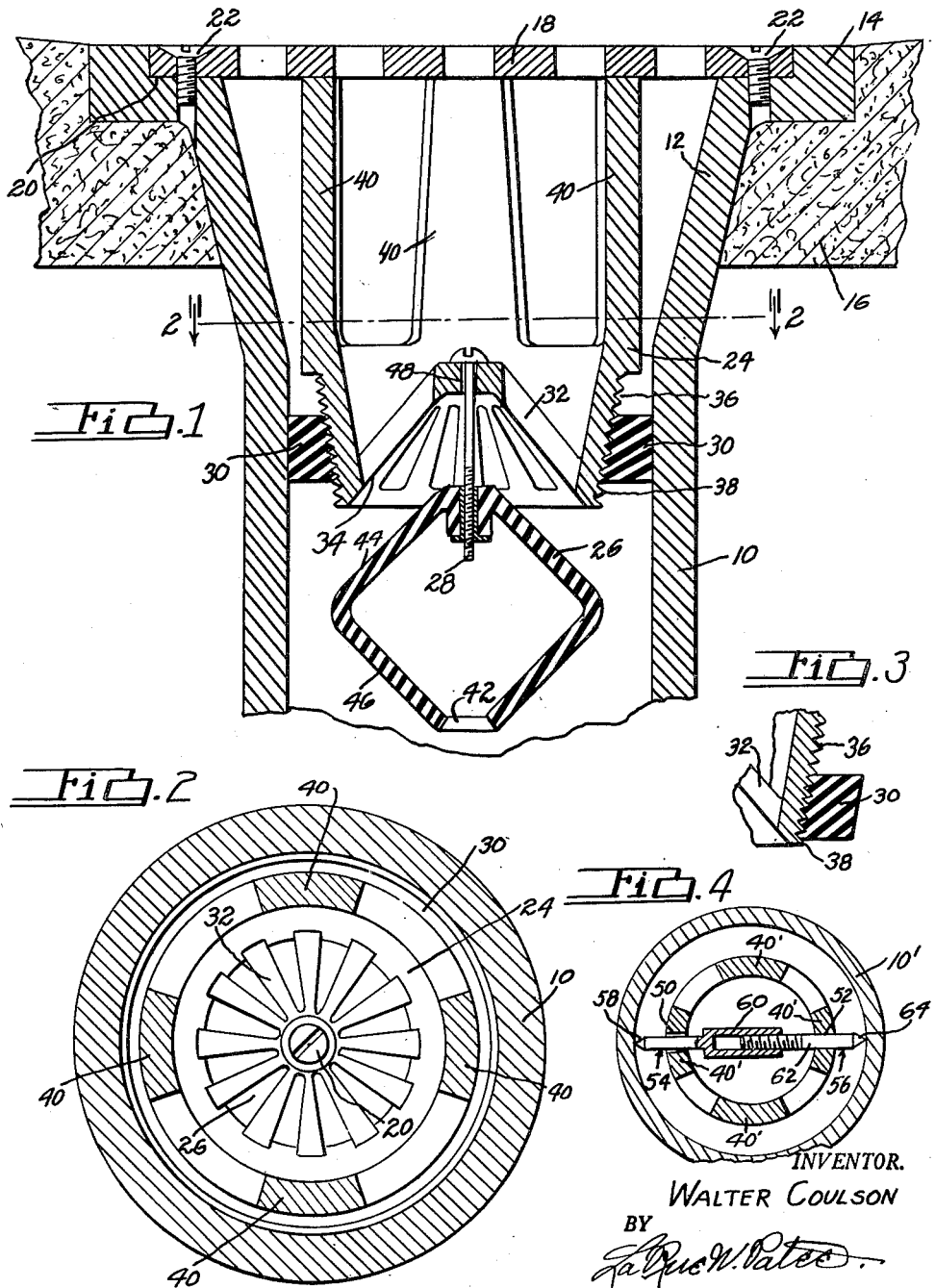
INVENTOR.
WALTER COULSON
BY
HIS ATTORNEY

2,787,376
AUTOMATIC CHECK VALVE FOR DRAIN PIPE

Walter Coulson, Detroit, Mich.

Application September 13, 1954, Serial No. 455,581

2 Claims. (Cl. 210—119)

This invention relates to certain new and useful improvements in an automatic check valve for sewers or drain pipes, and it consists in certain peculiarities of the construction, novel arrangement and operation of various parts thereof as will be hereinafter more fully set forth and specifically claimed.

The principal object of the invention is to provide a valve of the above mentioned type, which is simple and inexpensive in construction, strong, durable and efficient in operation, with its parts so made that the device can be readily installed within the drain pipe or removed therefrom to permit inspection, cleaning, or repair.

Another object is to so construct and arrange the parts of the valve that it will automatically close the opening of the drain pipe so as to prevent the back flow of water from the sewer into the basement or other place where the drain may be located, should the sewer become flooded.

A further object of the invention is to provide a hollow floating valve which is pliant for engagement with a conical valve seat at first in line contact and subsequently, as the pressure rises, the floating valve conforms to all areas of the valve seat.

A still further object of the invention is to provide a sealing ring between the internal diameter of the sewer pipe and check valve housing which fits over a tapered surface on the valve housing to accommodate it for the variations in drain pipe diameter and to arrange the tapered surface in a direction so that the pressure of the water forces the seal into tighter contact between the pipe and check valve body.

Other objects and advantages of the invention will more fully appear from the following description taken in connection with the accompanying drawings, in which:

Fig. 1 is a cross sectional view through the improved check valve showing its installation in a drain pipe;

Fig. 2 is a cross sectional view taken on line 2—2 of Fig. 1;

Fig. 3 is a fragmentary sectional view of the body and resilient ring, showing the ring before it is applied to a drain pipe; and Fig. 4 is a cross sectional view, on reduced scale, showing a self-contained means for locking the check valve in a drain.

Referring to the drawings, the invention has been illustrated for use in the drain pipe which leads from the basement to the sewer, and, while in the present instance the pipe is shown with its upper end located in the cement floor of a basement, it will be understood that the automatic check valve is adapted for use in drain pipes of various sizes, whether they are located in basements or other places, and for this reason the invention is not limited to use in any particular kind of drain pipe.

Referring to an illustrated embodiment of the invention, a drain pipe 10 is provided at its upper end with a flared open end 12 having an outer flange 14 which is cemented into a concrete floor 16 with the outer surface of the drain pipe flush with the floor surface. A perforated plate 18 which is received in a recess 20 provided in the flange 14 is detachably secured thereto by screws 22. The above is of usual and standard construction in basement floors where sewer drains are provided.

The improved check valve is adapted to be inserted as a unit in the open end of the drain pipe and held in place by the removable plate 18. The unit comprises a body 24, a float 26, guide rod 28 and sealing ring 30.

The body 24 is preferably a casting and comprises an annular lower portion having a cone shaped bottom wall which is grilled at 32, the outer surface of the bottom wall and grill forming a valve seat 34. The included angle of the cone is approximately 84 degrees and the cone is tapered inwardly and upwardly within the body 24. The outer surface of the lower annular portion is tapered upwardly from the bottom forming a tapered sealing ring seat 36 for the ring 30. The outer periphery of the outer tapered surface is provided with a plurality of circumferential ribs 38 which may be V-shaped or the ribs may be formed as screw threads.

The ring 30 is formed from rubber or other resilient synthetic material which expands in diameter as it is forced upwardly on the increasing diameter of the tapered surface. Before the body 24 and ring 30 are inserted in the drain pipe 10, the ring 30 has its outer diameter correspondingly tapered. That is, the outer surface of the ring is straight but when it is applied to the tapered surface the upper portion is stretched more than the lower portion, thus presenting a tapered ring for guiding the body and ring into the pipe 10. The rubber ring 30 is annular and rectangular in cross section.

The body 24 is provided with upwardly extending spaced arms 40 which abut against the under surface of the plate 18. When the valve unit is assembled in a drain pipe the plate 18 is removed and the unit is inserted in the pipe 10 with the rubber ring in tight frictional engagement with the inner surface of the pipe 10 and outer tapered surface 36 of the body 24. The unit is forced into the pipe 10 and the plate 18 applied to the outer end of the pipe, holding the unit against any outward movement. It is to be noted that any fluid pressure below the valve forces the ring into tighter engagement between the inner wall of the pipe 10 and the tapered surface of the body 24. Thus, a portion of the upward pressure is dissipated into lateral pressure on the pipe 10 and body 24, and the ring 30 more tightly seals the unit in the pipe.

The float valve 26 is preferably made of rubber, or other rubber-like material, and comprises a hollow body, open at its lower end, as at 42. The upper surfaces 44 of the valve 26 are tapered and have an included angle of approximately 90 degrees. The diameter of the valve 26 is slightly larger than the lower diameter of tapered surface 36 of the body 24 and the bottom wall is tapered downwardly, as at 46. The rising water first seals off the opening 42 and then the float valve rises. Due to the differences in taper of the surface 34 with the surface 44 the float valve 26 seats in a line contact. Any further pressure, after the valve is closed, causes the body of the float valve to conform to the entire area of the tapered surface 34 closing off the openings formed by the grill 32. The flexible material permits the float valve to conform to any irregular surfaces and acts as a perfect seal. In addition to this, after the float valve has made a line contact seal, water is forced into the inside of the float exerting pressure on the surfaces 44.

The float valve 26 is suspended on the headed rod 28 which has a sliding fit in an aperture 48 on the apex of the cone of body 24.

From the above, it will be seen that there has been provided a self-contained, unitary structure which is inexpensive to manufacture, one which requires no alterations in the drain pipe, and one which fits and securely seals pipes of slight difference in size without calking, cementing or threading.

If for any reason the plate 18 is insufficient for retaining the unit check valve in the drain, the device may be provided with self-contained locking means which engages the inner periphery of the drain to retain the unit in proper position within the drain. Such a device is illustrated in Fig. 4. A pair of oppositely disposed arms 40' are provided with apertures 50 and 52, the aperture 50 being annular and the aperture 52 being square or hexagonal. Two pins 54 and 56 are projected through the aperture. The one pin 54 is provided with a pointed end 58 at one end thereof and a threaded sleeve 60 at its opposite end. The other pin 56 has a shank portion 62 which slidingly fits the square or hexagon aperture 52 to prevent turning. The inner end of the pin 56 is round and screw-threaded to engage the internally threaded sleeve 60. The outer end of the pin 56 is pointed as at 64. By turning the pin 54 relative to the pin 56, the overall dimension of the pointed ends is expanded or retracted and when the check valve is in position the pointed ends are expanded by turning the sleeve 60, thereby forcing the pointed ends into the wall of the drain pipe 10', securely locking the check valve in proper position within the drain pipe.

It will be understood that various changes, including the size, shape and arrangement of parts, may be made without departing from the spirit of the invention and it is not the intention to limit its scope other than by the terms of the appended claims.

I claim:

1. In an automatic check valve for sewers and the like, the combination with a drain pipe having a perforated cap plate, of a body having a tapered outer peripheral surface adjacent its lower end received within said drain pipe, a resilient sealing ring between the inner periphery of said drain pipe and the tapered surface of said body, an apertured conical valve seat in the bottom of said body, a hollow float valve having a conical upper surface suspended from said body for free vertical movement toward said valve seat, said float valve being formed of flexible material and having an opening in its lower surface, the included angle of said conical valve seat being less than the included angle of the conical upper surface of said float valve, and an upwardly extending portion on said body in engagement with the perforated plate of said drain pipe.

2. In an automatic check valve for sewers and the like, the combination with a fixed drain pipe comprising, a sleeve-like body portion having a tapered outer surface at its lower end for insertion in said drain pipe, circumferential ribs in said outer surface, a resilient ring rectangular in cross section received on said tapered surface forming a seal between said drain pipe and said body portion and a support for said body, vertical extensions on said body portion at the upper end, upwardly and inwardly extending grills at the lower edge of said sleeve forming a conical valve seat, and a float valve suspended from the apex of said conical valve seat for vertical movement toward said valve seat, said float valve having a conical upper surface for engagement with said conical valve seat.

References Cited in the file of this patent

UNITED STATES PATENTS

| 414,240 | Norton | Nov. 5, 1889 |
| 1,120,713 | Hennessy | Dec. 15, 1914 |
| 1,667,877 | Star | May 1, 1928 |
| 2,049,909 | Kirschner | Dec. 15, 1932 |
| 2,478,976 | Modlin | May 22, 1947 |